United States Patent
Nguyen (10) Patent No.: US 8,046,821 B2
(45) Date of Patent: Oct. 25, 2011

(54) MECHANISM AND METHOD FOR CONTROLLING NETWORK ACCESS TO A SERVICE PROVIDER

(75) Inventor: Phil Tien Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1571 days.

(21) Appl. No.: 11/353,510

(22) Filed: Feb. 13, 2006

(65) Prior Publication Data

US 2007/0203970 A1 Aug. 30, 2007

(51) Int. Cl.
*G06F 7/04* (2006.01)
(52) U.S. Cl. ............. 726/2; 726/6; 726/7; 726/8; 726/9; 709/201; 709/202; 709/203; 709/225
(58) Field of Classification Search .................. 709/228, 709/206, 201–203; 713/162; 726/2
See application file for complete search history.

(56) References Cited

U.S. PATENT DOCUMENTS

| | | | |
|---|---|---|---|
| 6,714,979 B1 * | 3/2004 | Brandt et al. ................. | 709/225 |
| 7,353,541 B1 * | 4/2008 | Ishibashi et al. ............... | 726/26 |
| 2001/0034831 A1 * | 10/2001 | Brustoloni et al. ........... | 713/151 |
| 2002/0007455 A1 * | 1/2002 | Wiederin et al. .............. | 713/162 |
| 2003/0120502 A1 * | 6/2003 | Robb et al. ........................ | 705/1 |
| 2004/0044776 A1 * | 3/2004 | Larkin ........................... | 709/228 |
| 2005/0039050 A1 * | 2/2005 | Morand et al. ................ | 713/201 |
| 2007/0061396 A1 * | 3/2007 | Morris ........................... | 709/203 |
| 2007/0143829 A1 * | 6/2007 | Hinton et al. ..................... | 726/5 |

\* cited by examiner

*Primary Examiner* — Taghi Arani
*Assistant Examiner* — Jason Lee
(74) *Attorney, Agent, or Firm* — Fariba Yadegar-Bandari (57) ABSTRACT

Described are methods and mechanisms for controlling data access to a service provider. The method includes receiving an instruction at a proxy from a service provider to initiate a session and the instruction. The instruction includes service provider authentication data. The method further includes initiating the session at the proxy responsive to the received instruction. The session provides communication between the proxy and a customer device. The method additionally includes receiving a request for service from the customer device. The request includes customer identification data and customer transaction data. The method further includes producing protected data based on the service request, providing the protected data to a transaction buffer, and passing the protected data from the transaction buffer to the service provider.

34 Claims, 4 Drawing Sheets

MECHANISM AND METHOD FOR CONTROLLING NETWORK ACCESS TO A SERVICE PROVIDER

BACKGROUND OF THE INVENTION

The invention relates generally to the field of network security, and more particularly to network security between wide area and local area networks.

Network security is today an ever-increasing problem. Some service providers allow their customers, including other service providers, to access and provide transaction data to the service provider's server networks. This ability presents opportunities to allow product sales between service providers and may increase product and sales coordination between service providers as well.

Sending and receiving secure data is a requirement to operate most, if not all, server networks for their intended purposes. Unfortunately, as with most server networks, sending and receiving data securely is likely the Achilles heel of the network. There are numerous damaging programs (e.g. viruses, Trojan horses, and the like) that most server networks would be susceptible to in the event of exposure while operating in a wide area network (WAN) environment.

Conventional networks can perform various types of data management, and include the capability of providing security through the use of a firewall. Firewalls are available to assist in blocking and thereby protecting server networks from damaging programs and may be implemented in various forms, such as software programs, hardware devices, and the like. Unfortunately, even with these security measures networks continue to be susceptible to security breaches due to the need for some remote device to connect, even if through a firewall, to a device within the network.

An adequate system for protecting local networks has eluded those skilled in the art, until now.

SUMMARY OF THE INVENTION

The invention is directed to a system for controlling network access to a service provider inside a secure network. In one aspect, a method for controlling data access to a service provider includes receiving an instruction including service provider authentication data at a proxy from a service provider to initiate a session, initiating the session that provides communication between the proxy and a customer device at the proxy responsive to the received instruction, receiving a request for service that includes customer identification data and customer transaction data from the customer device, producing protected data based on the service request, providing the protected data to a transaction buffer, and passing the protected data from the transaction buffer to the service provider.

In another aspect, an apparatus within a DMZ for controlling network access to a service provider includes a proxy coupled to and receiving one-way communication from a service provider. The proxy is additionally coupled to a customer device. The apparatus additionally includes a transaction buffer coupled to the proxy. The transaction buffer is further coupled to and provides one-way communication to the service provider. The proxy receives an instruction from the service provider to initiate a session that allows communication between the proxy and the customer device. The proxy produces protected data responsive to a service request received from the customer device. The protected data is passed from the proxy to the transaction buffer for communication to the service provider.

In yet another aspect, a system for controlling network access to a service provider includes a router, a firewall coupled to and in communication with the router, a DMZ formed between the firewall to the router, and a secure network coupled to the firewall. The DMZ includes a proxy coupled to the router and the firewall, and a transaction buffer coupled to and in one-way communication with the proxy. The system is configured so that the one-way communication is from the proxy to the transaction buffer. The secure network includes a switch coupled to the firewall and a service provider including at least one server. The service provider is coupled to the switch and in one-way communication with the proxy via the switch and the firewall. The system is configured so that the one-way communication is from the service provider to the proxy. The system is further configured so that the service provider is further in one-way communication with the transaction buffer via the firewall and the switch. The system is additionally configured so that the one-way communication is from the service provider to the proxy. The system further includes computer-readable media having computer executable instructions stored thereon, wherein the computer executable instructions are configured, when executed by a server, to cause the proxy to receive an instruction from the service provider to initiate a session. The initiated session allows communication between the proxy and a customer device. The computer executable instructions are further configured, when executed by a server, to cause the proxy to produce protected data responsive to a service request received from the customer device. The computer executable instructions are additionally configured, when executed by a server, to cause the protected data to be passed from the proxy to the transaction buffer for communication to the service provider.

DETAILED DESCRIPTION

What follows is a detailed description of various techniques and mechanisms for managing network security. Very generally stated, the present invention is directed to controlling network access to a service provider's network server from outside the service provider's network.

Figure 1:
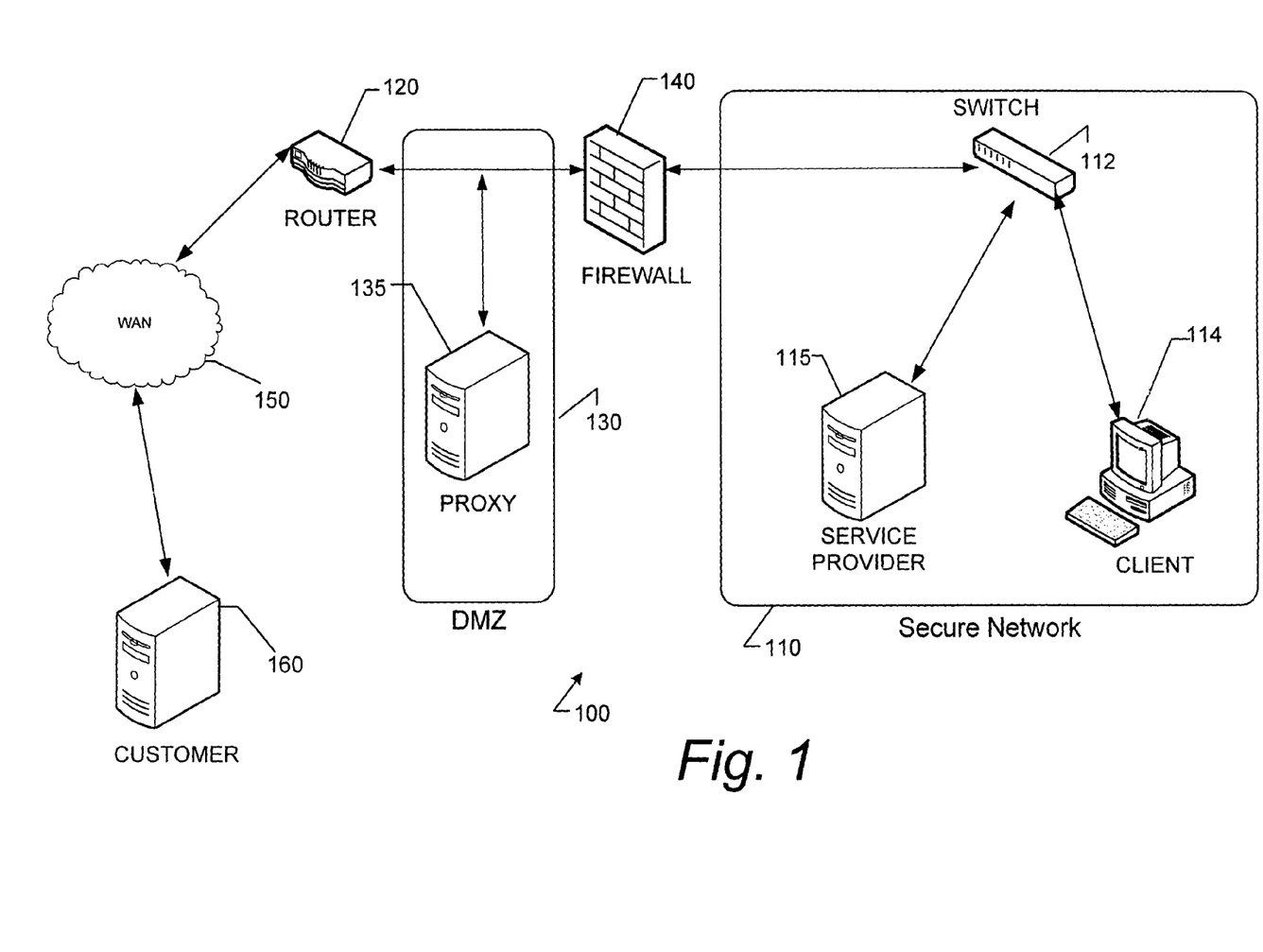
FIG. 1 is a functional block diagram generally illustrating a system for controlling data access to a service provider that is configured in accordance with an embodiment of the invention.

FIG. 1 is a functional block diagram generally illustrating a system 100 for controlling network access to a service provider's local network. System 100 is implemented as a network that includes a sample secure network 110 that is coupled to and in communication with a sample firewall 140. System 100 further includes a sample router 120 coupled to and in communication with the firewall 140. The area between the router 120 and the firewall 140 is a relatively low security area of the overall network (commonly referred to as a "DMZ") 130. Also illustrated is a sample wide area network (WAN) 150 coupled to and in communication with the router 120. A sample customer device 160 is also coupled to the WAN 150. System 100 may include additional components not relevant to the present discussion.

In one embodiment, one or more of the couplings between components are implemented as wired network connections, such as by utilizing land line or hard wired network communications signal, for example, an Ethernet connection signal, a universal serial bus connection signal, an IEEE 1394 (Firewire) connection signal, or the like. In another embodiment, one or more of the couplings between components are implemented as wireless network connections, such as by utilizing a Bluetooth connection signal, a wireless local area network signal (e.g. an IEEE 802.11 series signal), a wireless wide area network signal, or the like. These are intended as non-exhaustive lists and many other alternatives are possible.

Figure 3:
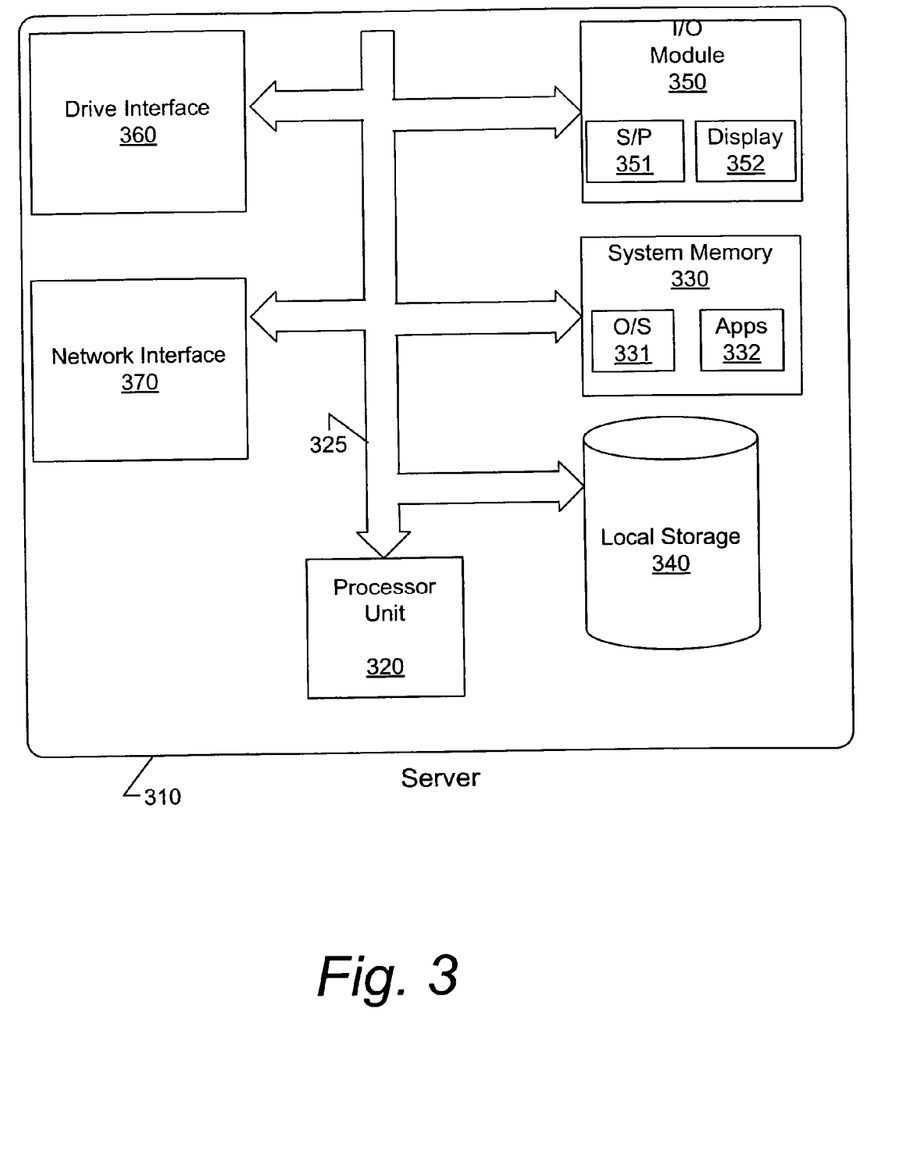
FIG. 3 is a functional block diagram generally illustrating a computing device with which implementations of the invention are particularly applicable.

In FIG. 1, secure network 110 includes a sample switch 112 that is coupled to and in communication with firewall 140. Secure network 110 further includes a sample client 114 coupled to and in communication with switch 112 as well as service provider 115 that is also coupled to and in communication with switch 112. Switch 112 allows different nodes (e.g. a network connection point, typically a computer), such as sample client 114 and service provider 115, to communicate directly with one another in a smooth and efficient manner. Additionally, switch 112 (as configured) allows components within secure network 110 to communicate with components outside of secure network 110. Switch 112 can be implemented as any commercially available switch. Client 114 is any computing device configured to access devices within the secure network 110, such as a personal computer (PC), a laptop, and the like. In an example, a computing device implemented as client 114 is shown in FIG. 3 and described below. Service provider 115 may be any server device, such as in a primary server or a secondary server configuration, implemented utilizing a computing device. In an example, a computing device implemented as service provider 115 is shown in FIG. 3 and described below.

Router 120 handles network addressing for each device within its domain, and exposes the devices within its domain to the WAN 150. More specifically, the router 120 exposes one public Internet Protocol (IP) address to the WAN 150, and assigns unique IP addresses to devices within its domain. The router 120 performs address translation to send and receive data to and from devices within the secure network 110 and devices connected to the WAN 150, such as the customer 160. In addition, router 120 prevents data traffic within its LAN from unnecessarily spilling over from one node to another node. Router 120 can be implemented as any commercially available router.

The firewall 140 is, in this implementation, a hardware device that filters the information coming through router 120 and into secure network 110. Firewall 140 includes filters that test incoming packets of data based on predefined criteria. If an incoming packet of information is flagged by the filters, it is not allowed through. Examples of filtering conducted by firewalls include packet filtering, port blocking, Media Access Control (MAC) address blocking, stateful inspection, and the like. In an example of packet filtering, packets (small chunks of data) are analyzed against a set of criteria to determine whether to allow the packets to cross the firewall. Packets that survive the filters are allowed in to or out of the secure network 110 to the requesting system, and all others are discarded. In an example of stateful inspection, the contents of each packet are not inspected, but instead certain key parts of the packet are compared to a database of trusted data. Data traveling from inside the firewall to the outside is monitored for specific defining characteristics and then incoming data is compared to these characteristics. If the comparison yields a reasonable match, the data is allowed through. Otherwise the data is discarded.

The firewall 140 prevents unauthorized access to any device within the secure network 110 by devices outside the secure network 110. However, in order for any data to be exchanged between devices inside and outside the secure network 110, the firewall 140 must allow some communication to occur. It is this dilemma that many hackers and other malicious individuals exploit while attempting to gain unauthorized access to devices within the secure network 110. Firewall 140 can be implemented as any commercially available firewall.

Within the DMZ 130, a computing device, proxy 135, is configured to enable secure communications between computing devices outside the router 120 and computing devices within the secure network 110. DMZ 130 refers to a portion of the network that is neither part of the internal network (e.g. secure network 110) nor directly part of the Internet (e.g. WAN 150). In FIG. 1, DMZ 130 is the area between the router 120 and the firewall 140 that is protecting secure network 110. Alternatively, the DMZ 130 could be located between any two policy-enforcing components of a network architecture. In another embodiment, the DMZ 130 could be created by putting access control lists on an access router (e.g. router 120). In this embodiment, placing access control lists on the access router minimizes the exposure of hosts (e.g. client 114 and service provider 115) on a LAN (e.g. secure network 110) by allowing only recognized and managed services on those hosts (e.g. via proxy 135) to be accessible by other devices (e.g., customer device 160) on the Internet (e.g. WAN 150). Proxy 135 is any server device implemented as a computing device, such as the computing device illustrated in FIG. 3 and described below.

WAN 150 is a wide area network of interconnected networks including domain name servers (DNS), network access points (NAP), and backbones. In one embodiment, WAN 150 is a portion of a network of networks and is referred to as the Internet. Customer device 160 is any computing device configured to interact with other devices over the WAN 150. In this example, the customer device 160 is configured to interact with the proxy 135. In one embodiment, customer device 160 is implemented using a computing device as shown in FIG. 3 and described below.

In illustrative operation, proxy 135 has a logical connection with service provider 115. Proxy 135 is configured to communicate with devices outside the router 120 only after the service provider 115 initiates a session with the proxy 135, such as using a one-directional Virtual Private Network (VPN) connection. While this session is active, the proxy 135 is allowed to communicate with devices associated with WAN 150, such as customer device 160. For instance, the proxy 135 may receive a request for "service" from customer device 160, where "service" could be any form of bidirectional communication such as delivering information or data to the proxy 135, retrieving information or data from the proxy 135, or otherwise communicating with the proxy 135 in the interest of interacting with devices within the secure network 110.

Figure 2:
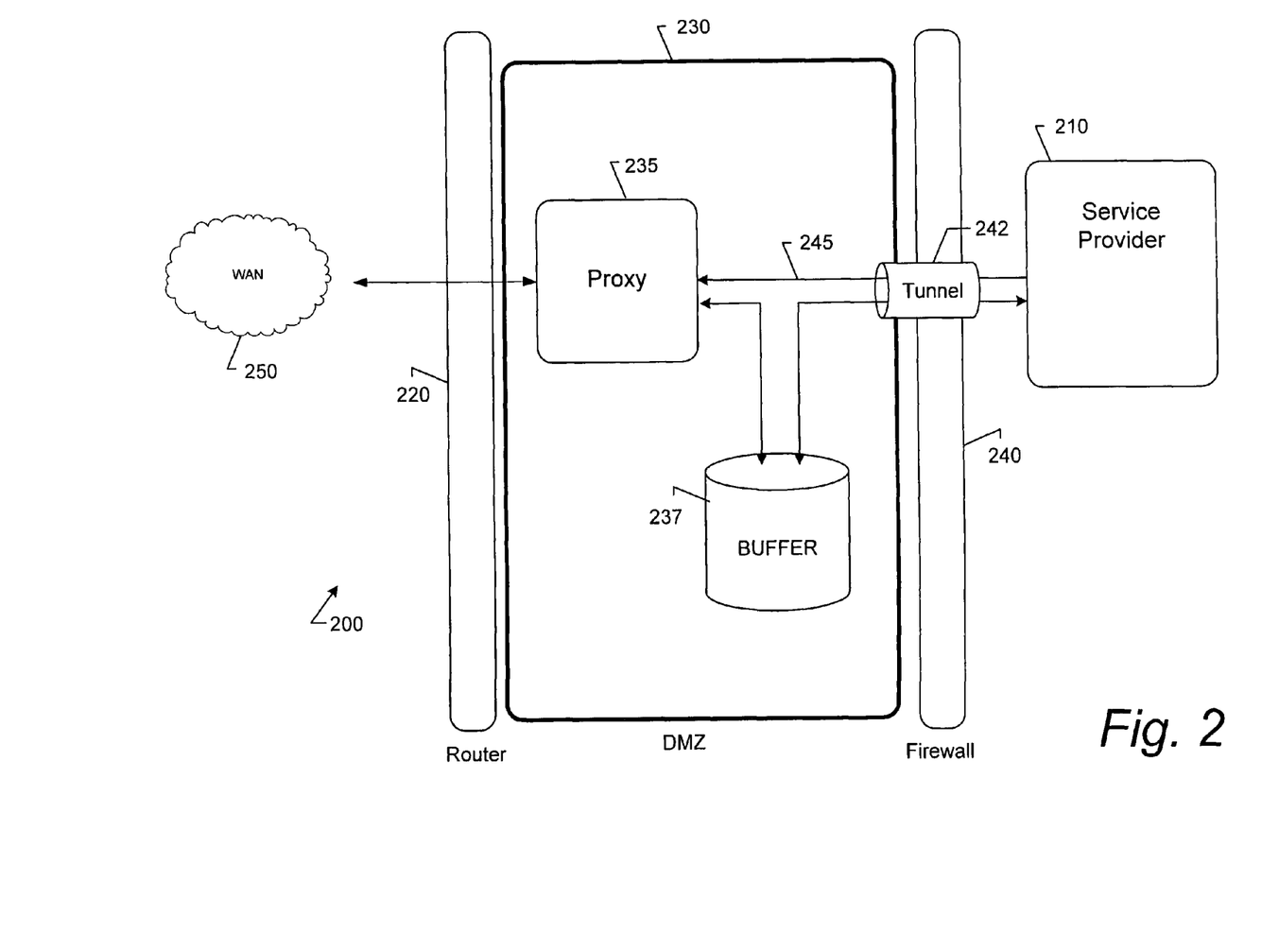
FIG. 2 is a functional block diagram generally illustrating an apparatus within a DMZ for controlling data access to a service provider in accordance with an embodiment of the invention.

In accordance with the invention, and as described in greater detail in conjunction with FIG. 2, the proxy 135 is configured to produce protected data (see FIG. 2 and discussion, below) based on the service request from the customer 160. The protected data is retrieved from the proxy 135 by the service provider 115. The service provider 115 may return any information or data to the customer 160 over the secure session with the proxy 135.

FIG. 2 is a functional block diagram illustrating in slightly greater detail portions of a system 200 including a DMZ for controlling data access to a service provider within a secure network. System 200 includes a sample service provider 210, a sample router 220, a sample DMZ 230, a sample firewall 240, and a sample wide area network (WAN) 250. DMZ 230 includes a sample proxy 235 and a sample transaction buffer 237. Service provider 210 is connected to proxy 235, proxy 235 is connected to transaction buffer 237, and transaction buffer 237 is connected to service provider 210. System 200 may include additional components not relevant to the present discussion.

Service provider 210 may be any device that is configured to interact with other devices for some purpose. In one example, the service provider 210 may maintain databases of transactional data, such as information about purchase and sale transactions that have occurred between customers and the entity that maintains the service provider 210. In such an example, that entity make desire to make information (e.g., product catalog information, pricing, etc.) stored at the service provider 210 available to the customers, and to receive information (e.g., purchase requests, transaction details, etc.) at the service provider 210 from the customers related to new transactions. Many other examples will become apparent to those in the industry. The service provider 210 shown in FIG. 2 may represent more than a single service provider, with each service provider being associated with different functionality or perhaps the plurality of service providers can be used for load balancing.

As discussed above, the router 220 joins networks within its local area network (LAN), such as the proxy 235, to networks outside of its LAN (e.g. within WAN 250). In addition, the router 220 hands out IP addresses to devices within its LAN to enable those devices to communicate with each other. Also as described above, the firewall 240 is a hardware device that filters information coming through router 220 and into service provider 210.

DMZ 230 refers to a portion of the network that is neither part of the internal network (e.g. service provider 210) nor directly part of the Internet (e.g. WAN 250). In FIG. 2, DMZ 230 is the area between the router 220 and the firewall 240 that is protecting the service provider 210.

The proxy 235 is a computing device configured to only receive communication from the service provider 210 over a secure one-directional link 245, such as a secure VPN connection (e.g., tunnel 245). More specifically, the secure link 245 allows for the negotiation of the communications link and for passing data and instructions from the service provider 210 to the proxy 235. However, the secure link 245 does not allow the proxy server 235 to pass information or data back to the service provider 210. Rather, the proxy 235 is configured to post information or data into a transaction buffer 237 for retrieval by the service provider 210.

The transaction buffer 237 is an allocated memory area, such as network attached storage or perhaps even a dedicated computing device, for the reception of and caching of data. Transaction buffer 237 could be implemented using any non-volatile memory, such as ROM memory, flash memory, magnetic disk drive, read/write optical storage, just to name a few. Transaction buffer 237 may also be implemented as any combination of those or other technologies, such as a magnetic disk drive with cache (RAM) memory, or the like. In one embodiment, transaction buffer 237 is co-located with proxy 235. In another embodiment, transaction buffer 237 is located separate from proxy 235. In yet another embodiment, transaction buffer 237 is implemented as one or more transaction buffers associated with one or more service providers. In such an example, each transaction buffer may be associated with and in one-way communication with an associated service provider. Such a configuration may be advantageous for load balancing and/or scalability.

In operation, the firewall 240 blocks any ports accessible by proxy 235 other than those required to support the secure link 245. Proxy 235 and service provider 210 are configured so that service provider 210 must initiate communication to proxy 235. In this example, a VPN connection (e.g., tunnel 245) may allow one or more service providers to access proxy 235. The VPN permits secure, encrypted connections between remote members of a network in a secure and reliable manner using an intranet and/or the Internet as the medium to connect computing devices, for example including service provider 210 and proxy 235.

In this illustration, the proxy 235 is unable to communicate with other devices on the WAN 250 unless instructed to do so by the service provider 210. In other words, the proxy 235 fails any requests for service from customers (not shown) via WAN 250 prior to reception and authentication of an instruction from service provider 210. After reception at proxy 235 of the instruction from service provider 210, proxy 235 initiates makes itself available for communication with other deices on the WAN 250.

When a communication is received at the proxy 235 from a device on the WAN 250, the proxy 235 produces a message for posting in the transaction buffer 237. For example, a customer device (not shown) on the WAN 250 may connect to the proxy 235 and indicate that a purchase transaction has occurred. The customer device may provide to the proxy 235 details of that transaction. The details could include customer identification data and customer transaction data. In one embodiment, the proxy 235 authenticates the customer device (not shown) that sent the request for service by authenticating the customer identification data. In one embodiment, the proxy 235 may parse the customer transaction data to extract non-executable commands and transactional data. Likewise, the proxy 235 may perform security-related tests on the inbound communication from the customer device, such as virus checking and the like.

Proxy 235 then posts protected data (e.g., a message including the relevant information from the customer device) to transaction buffer 237. In one embodiment, proxy 235 provides the protected data to one or more transaction buffers based on the contents of the data and commands within the protected data. In one embodiment, one or more transaction buffers pass the protected data to one or more service providers based on the data and commands within the protected data.

The service provider 210 retrieves the protected data from the buffer 237 through the firewall 240, perhaps periodically or based on a schedule. By retrieving the protected data from the buffer 237, rather than by allowing the proxy 235 to deliver the data over secure link 245, the service provider 210 is secure against inbound attacks or malicious attempts to access data under the control of the service provider 210. In this configuration, the service provider 210 only communicates with the proxy 235 to issue instructions to the proxy 235, and any inbound communication from the proxy 235 must pass through the buffer 237. In this way, if the integrity of the proxy 235 is compromised in some way, there is no direct connection to the service provider 210 through which the service provider 210 may also be compromised. In a high performance implementation, the buffer 237 would be created in memory and attached directly to the secure link 245 in order to provide a fast notification of the availability of the protected data in the buffer 237.

Once the service provider 210 has completed whatever tasks have been requested, based on the data retrieved from the buffer 237, the service provider 210 posts its response back to the buffer 237. For example, the service provider 210 may retrieve data from data bases local to the service provider 210, compose status reports, or prepare other data based on the incoming data from the customer via the proxy 235 and the buffer 237. The service provider 210 then writes that response data back to the buffer 237 for retrieval by the proxy 235. The service provider 210 may optionally issue an instruction to the proxy 235 to retrieve the response data via the secure link 245. Optionally, the proxy 235 may be configured to periodically query the buffer 237 for response data. The proxy 235 can then forward the response data back to the requesting customer over the WAN 250.

FIG. 3 is a functional block diagram generally illustrating a sample computing device 310 that may be used in particular implementations of the invention. The computing device 310 may be any computing device, such as a personal computer (PC), a laptop, a server computer, and the like. Although described above in the context of a server computing device, it should be appreciated that certain implementations of the invention may be employ other devices, such as laptop computers, desktop computers, handheld computers, minicomputers, mainframe computers, headless servers and the like. Implementations of the invention may also be practiced in distributed computing environments where certain tasks are performed by remote processing devices linked through a communications network. In a distributed computing environment, program modules may be located in both local and remote memory storage devices.

The computing device 310 includes a processing unit 320, a system memory 330, and a system bus 325 that couples various system components including the system memory to the processing unit 320. The system bus 325 may be any of several types of bus structures including a memory bus or memory controller, a peripheral bus, and a local bus using any of a variety of bus architectures. The system memory includes read-only memory (ROM) and random access memory (RAM). A basic input/output system (BIOS), containing the basic routines that help to transfer information between elements within the computing device 310, such as during start-up, is stored in the ROM.

The computing device 310 may further include local storage 340, such as a hard disk drive for reading from and writing to a hard disk (not shown), a magnetic disk drive (not shown) for reading from or writing to a removable magnetic disk(not shown), and an optical disk drive (not shown) for reading from or writing to a removable optical disk (not shown) such as a CD-ROM or other optical media. The hard disk drive, magnetic disk drive, and optical disk drive are connected to the system bus 325 by a drive interface 360, which represents one or more drive interfaces, such as a hard disk drive interface, a magnetic disk drive interface, and an optical drive interface. The drives and their associated computer-readable media provide non-volatile storage of computer-readable instructions, data structures, program modules and other data for the computing device 310.

Although the exemplary computer system describes the employment of a hard disk, a removable magnetic disk, and a removable optical disk, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs) and the like may also be used in the exemplary computing device.

A number of program modules may be stored on the hard disk, magnetic disk, optical disk, ROM or RAM, including an operating system 331, one or more application programs 332, other program modules and program data. A user may enter commands and information into the computing device 310 through input devices such as a keyboard and pointing device. Other input devices (not shown) may include a microphone, joystick, game pad, satellite dish, scanner or the like. These and other input devices are often connected to the processing unit 320 through input/output (I/O) module interface 350 that is coupled to system bus 325 and that may include one or more additional specific interfaces, such as serial port interface 351 a parallel port (not shown), game port (not shown) or universal serial bus (USB) (not shown). A monitor (not shown) or other type of display device is also connected to the system bus 325 via an interface, such as video adapter 352. In addition to the monitor, computing devices typically include other peripheral output devices, such as an auxiliary display or speakers and printers (not shown). An auxiliary display is an additional output device connected to the system bus 325 via an auxiliary display interface, which may be a video adaptor, USB or other peripheral device connection. The input device for controlling the auxiliary display is connected to system bus 325 via I/O module interface 350, which may be a serial interface, USB or other peripheral device connection.

The computing device 310 may operate in a networked environment using logical connections to one or more remote computers. The remote computer may be another personal computer, a server, a router, a network PC, a peer device or other common network node, and typically includes many or all of the elements described above relative to the computing device 310. Such networking environments are commonplace in offices, enterprise-wide computer networks, Intranets and the Internet. When used in a LAN networking environment, the computing device 310 is connected to the local network through a network interface or adapter. When used in a WAN networking environment, the computing device 310 typically includes a modem or other means for establishing communications over the wide area network, such as the Internet. In one embodiment, the modem, which may be internal or external, is connected to the system bus 325 via the serial port interface within I/O module interface 350.

In a networked environment, program modules depicted relative to computing device 310, or portions thereof, may be stored in the remote memory storage device. It will be appreciated that the network connections shown are exemplary and other means of establishing a communications link between the computers may be used and would include a virus detection device implemented in a similar or alternative embodiment as necessitated by the communications link.

Figure 4:
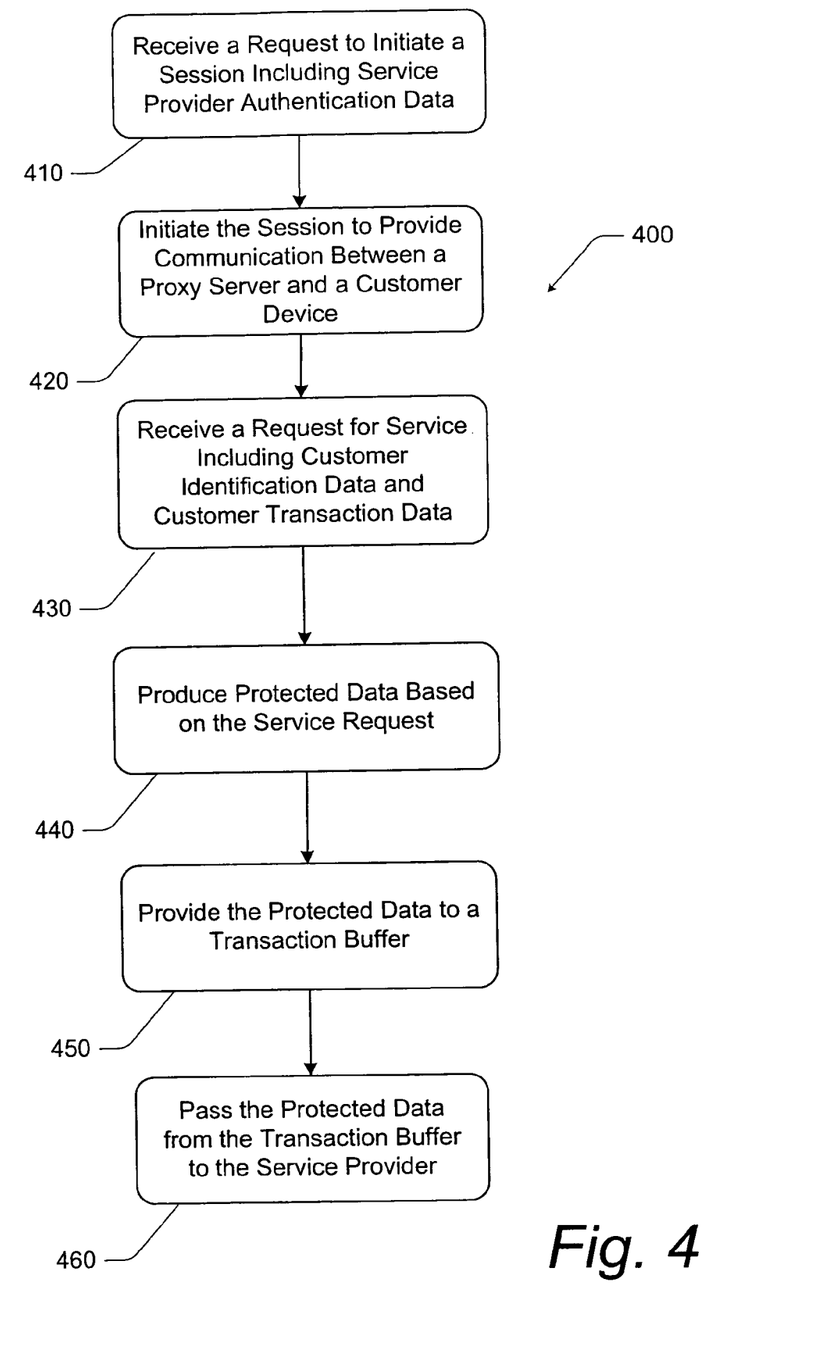
FIG. 4 is an operational flow diagram generally illustrating a process for controlling data access to a service provider.

FIG. 4 is an operational flow diagram generally illustrating a method 400 for controlling network access to a service provider. In one embodiment, method 400 is implemented with components of the exemplary operating environments of FIGS. 1, 2, and 3. One or more steps of method 400 may be embodied in a computer-readable medium containing computer-readable code such that a series of steps are implemented when the computer-readable code is executed on a computing device. In some implementations, certain steps of method 400 are combined, performed simultaneously or in a different order, without deviating from the objective of method 400.

At step 410, an instruction from a service provider to initiate a session is received at a proxy. The instruction may be received over a secure one-directional link, and may include exchanging authentication data between the service provider and the proxy. The authentication data allows the proxy to verify (see step 420, below) the identity of the service provider, and the service provider to verify the identify of the proxy. In one embodiment, the service provider authentication data includes a service provider authentication certificate, and proxy authentication data includes a proxy certificate. In an example and referring to FIG. 2 above, proxy 235 receives an instruction from service provider 210 to initiate a session. In this example, the request is a one-way communication from service provider 210 to proxy 235.

At step 420, the proxy initiates the session with the service provider responsive to the received instruction. In one embodiment, the proxy initiates the session responsive to the received instruction by authenticating the service provider based on the service provider authentication data. In this embodiment, the proxy authenticates the service provider by comparing a service provider authentication certificate within the service provider authentication data to a root certificate at the proxy. In this embodiment, the initiation of the session signals to the proxy that it may communicate with external devices, such as a customer device.

In an example and referring to FIG. 2 above, proxy 235 initiates the session responsive to the instruction received from service provider 210 by authenticating service provider 210 based on the service provider authentication data. After authenticating service provider 210 and initiating the session, proxy 235 awaits a communication from a customer device 210.

At step 430, a request for service from the customer device is receiving at the proxy. The request may include customer identification data and customer transaction data. The customer identification data is sufficient to allow the proxy to verify the identity of the customer device. In an example and referring to FIG. 1 above, a request for service from customer device 160 is received at the proxy 130.

At step 440, the proxy produces protected data based on the service request from the customer device. In one implementation, the protected data includes non-executable commands, identity information, and/or data. In this embodiment, the proxy may additionally authenticate the customer device by comparing the customer identification data received from the customer device to customer identification data corresponding to the customer device stored at the proxy. In an example and referring to FIG. 2 above, proxy 235 produces protected data based on the service request received from a client device (not shown) via WAN 250.

At step 450, the proxy posts the protected data to a transaction buffer. In one embodiment, the transaction buffer is configured to receive communication from the proxy. In an example and referring to FIG. 2 above, proxy 235 provides the protected data to transaction buffer 237 that is configured to receive one-way communication from proxy 235 by communicating the protected data to transaction buffer 237, receiving the protected data to transaction buffer 237, and caching the received protected data at transaction buffer 237.

At step 460, the protected data is passed from the transaction buffer to the service provider. In one implementation, the service provider is configured to receive one-way communication from the transaction buffer. In that implementation, the service provider is configured to periodically, perhaps based on a schedule, query the transaction buffer for the existence of new data and to retrieve that new data if it exists. In an example and referring to FIG. 2 above, the protected data is passed from transaction buffer 237 to the service provider 210.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations modifications, additions and improvements fall within the scope of the invention as detailed within the following claims.

I claim:

1. A method for controlling data access to a service provider, comprising:
   receiving an instruction at a proxy from the service provider to initiate a session, the instruction including service provider authentication data;
   initiating the session at the proxy responsive to the received instruction, the initiation of the session enabling communication between the proxy and a customer device;
   receiving a request for service from the customer device;
   producing protected data based on the service request;
   providing the protected data to a transaction buffer; and
   enabling the protected data to be retrieved from the transaction buffer by the service provider.

2. The method of claim 1, wherein the service request includes customer identification data and customer transaction data.

3. The method of claim 1, wherein initiating the session at the proxy comprises:
   authenticating the service provider based on the service provider authentication data; and
   enabling a communication gateway responsive to the service provider authentication, the communication gateway for transferring data between the customer device and the proxy.

4. The method of claim 3, wherein authenticating the service provider based on the service provider authentication data comprises comparing a service provider authentication certificate within the service provider authentication data to a corresponding certificate at the proxy.

5. The method of claim 1, wherein producing protected data based on the service request comprises:
   authenticating the customer device based on customer identification data received in the service request;
   parsing customer transaction data received in the service request; and
   generating the protected data from the parsed customer transaction data, the protected data including non-executable commands, identity information, and transaction data.

6. The method of claim 1, wherein providing the protected data to the transaction buffer comprises:
   communicating the protected data to the transaction buffer; and
   caching the communicated protected data at the transaction buffer.

7. The method of claim 1, wherein the proxy is configured to receive one-way communication from the service provider.

8. The method of claim 1, wherein the transaction buffer is configured to receive bidirectional communication from the proxy.

9. The method of claim 1, wherein the service provider is configured to receive bidirectional communication from the transaction buffer.

10. An apparatus within a DMZ for controlling network access to a service provider, comprising:

a proxy coupled to the service provider for one-way communication from the service provider to the proxy through a firewall, the proxy being additionally coupled to a customer device; and a transaction buffer coupled to the proxy, the transaction buffer further coupled to and providing bidirectional communication through the firewall to the service provider, wherein a service request received at the proxy, while in an active session with the service provider, from the customer device is transformed to protected data by the proxy and passed from the proxy to the transaction buffer for retrieval by the service provider.

11. The apparatus of claim 10, wherein the active session is initiated by the service provider by issuing an instruction to the proxy over the one-way communication, the instruction including service provider authentication data.

12. The apparatus of claim 11, wherein the service provider authentication data includes a service provider authentication certificate.

13. The apparatus of claim 11, wherein the proxy uses the service provider authentication data to authenticate the service provider and enables a communication gateway responsive to the service provider authentication, the communication gateway being to support data communications between the customer device and the proxy.

14. The apparatus of claim 13, wherein the proxy authenticates the service provider by comparing a service provider authentication certificate within the service provider authentication data to a proxy certificate at the proxy.

15. The apparatus of claim 10, wherein the service request includes customer identification data and customer transaction data.

16. The apparatus of claim 15, wherein the proxy produces the protected data by authenticating the customer device based on the customer identification data, parsing the customer transaction data, and generating the protected data from the parsed customer transaction data, the protected data including non-executable commands and transaction data.

17. A proxy for controlling network access to a service provider, comprising:
means for receiving an instruction at the proxy from the service provider over a one-way communication link to initiate a session, the received instruction including service provider authentication data;
means for initiating the session at the proxy responsive to the received instruction, the session enabling communication between the proxy and a customer device;
means for receiving at the proxy a request for service from the customer device, the service request including customer identification data and customer transaction data;
means for producing protected data based on the service request;
means for providing the protected data to a transaction buffer; and
means for passing the protected data from the transaction buffer to the service provider.

18. A system for controlling network access to a service provider, the network including a router and a firewall in communication with the router, the system comprising:
a DMZ formed between the firewall and the router, the DMZ comprising:
a proxy coupled to the router and the firewall; and
a transaction buffer coupled to the proxy;
a secure network coupled to the firewall but not inside the DMZ, the secure network comprising:

the service provider including at least one server, the service provider in one-way communication with the proxy via the firewall, the one-way communication being from the service provider to the proxy, the service provider further in communication with the transaction buffer via the firewall, the communication being from the transaction buffer to the service provider; and
computer-readable media having computer-executable instructions stored thereon, the computer-executable instructions configured, when executed, to cause:
the proxy to receive an instruction from the service provider to initiate a session, the initiated session allowing communication between the proxy and a customer device;
the proxy to produce protected data responsive to a service request received from the customer device; and
the protected data to be passed from the proxy to the transaction buffer for communication to the service provider.

19. The system of claim 18, wherein the instruction from the service provider includes service provider authentication data.

20. The system of claim 19, wherein the service provider authentication data includes a service provider authentication certificate.

21. The system of claim 19, wherein the proxy uses the service provider authentication data to authenticate the service provider, thus enabling a communication gateway in response to the service provider authentication, the communication gateway being for communications between the customer device and the proxy.

22. The system of claim 21, wherein the proxy authenticates the service provider by comparing a service provider authentication certificate within the service provider authentication data to a proxy certificate at the proxy.

23. The system of claim 22, wherein the service request includes customer identification data and customer transaction data.

24. The system of claim 23, wherein the proxy produces the protected data by authenticating the customer device based on the customer identification data, parsing the customer transaction data, and generating the protected data from the parsed customer transaction data, the protected data including non-executable commands and transaction data.

25. A non-transitory computer-readable storage medium storing a computer-executable instructions to control network access to a service provider, comprising:
computer-readable code to receive an instruction at a proxy from the service provider to initiate a session, the instruction including service provider authentication data;
computer-readable code to initiate the session at the proxy responsive to the received instruction, the session enabling communication between the proxy and a customer device;
computer-readable code to receive a request for service from the customer device, the service request including customer identification data and customer transaction data;
computer-readable code to produce protected data based on the service request;
computer-readable code to provide the protected data to a transaction buffer; and
computer-readable code to enable retrieval of the protected data from the transaction buffer by the service provider.

26. The non-transitory computer-readable storage medium of claim 25, wherein the service provider authentication data includes a service provider authentication certificate.

27. The non-transitory computer-readable storage medium of claim 25, wherein the computer-readable code to initiate the session at the proxy comprises:
   computer-readable code to authenticate the service provider based on the service provider authentication data; and
   computer-readable code to enable a communication gateway responsive to the service provider authentication, the communication gateway being for communications between the customer device and the proxy.

28. The non-transitory computer-readable storage medium of claim 27, wherein the computer-readable code to authenticate the service provider based on the service provider authentication data comprises computer-readable code to compare a service provider authentication certificate within the service provider authentication data to a corresponding certificate at the proxy.

29. The non-transitory computer-readable storage medium of claim 25, wherein the computer-readable code to produce protected data based on the service request comprises:
   computer-readable code to authenticate the customer device based on the customer identification data;
   computer-readable code to parse the customer transaction data; and
   computer-readable code to generate the protected data from the parsed customer transaction data, the protected data including non-executable commands and transaction data.

30. The non-transitory computer-readable storage medium of claim 25, wherein the computer-readable code to provide the protected data to the transaction buffer comprises:
   computer-readable code to communicate the protected data to the transaction buffer; and
   computer-readable code to cache the communicated protected data at the transaction buffer.

31. The non-transitory computer-readable storage medium of claim 25, further comprising computer-readable code to configure the proxy to receive one-way communication from the service provider.

32. The non-transitory computer-readable storage medium of claim 25, further comprising computer-readable code to configure the transaction buffer to receive bidirectional communication from the proxy.

33. The non-transitory computer-readable storage medium of claim 25, further comprising computer-readable code to configure the service provider to receive bidirectional communication from the transaction buffer.

34. The method of claim 1, wherein the service request is received from the customer device after the initiating step.

* * * * *